March 22, 1960 W. R. GRISWOLD ET AL 2,929,404
COUPLING-ACTUATED DUCT VALVE
Filed May 19, 1958 2 Sheets-Sheet 1

INVENTOR.
WALLACE R. GRISWOLD
HARRY M. PASSMAN
BY
ATTORNEY
AGENT

March 22, 1960 W. R. GRISWOLD ET AL 2,929,404
COUPLING-ACTUATED DUCT VALVE
Filed May 19, 1958 2 Sheets-Sheet 2
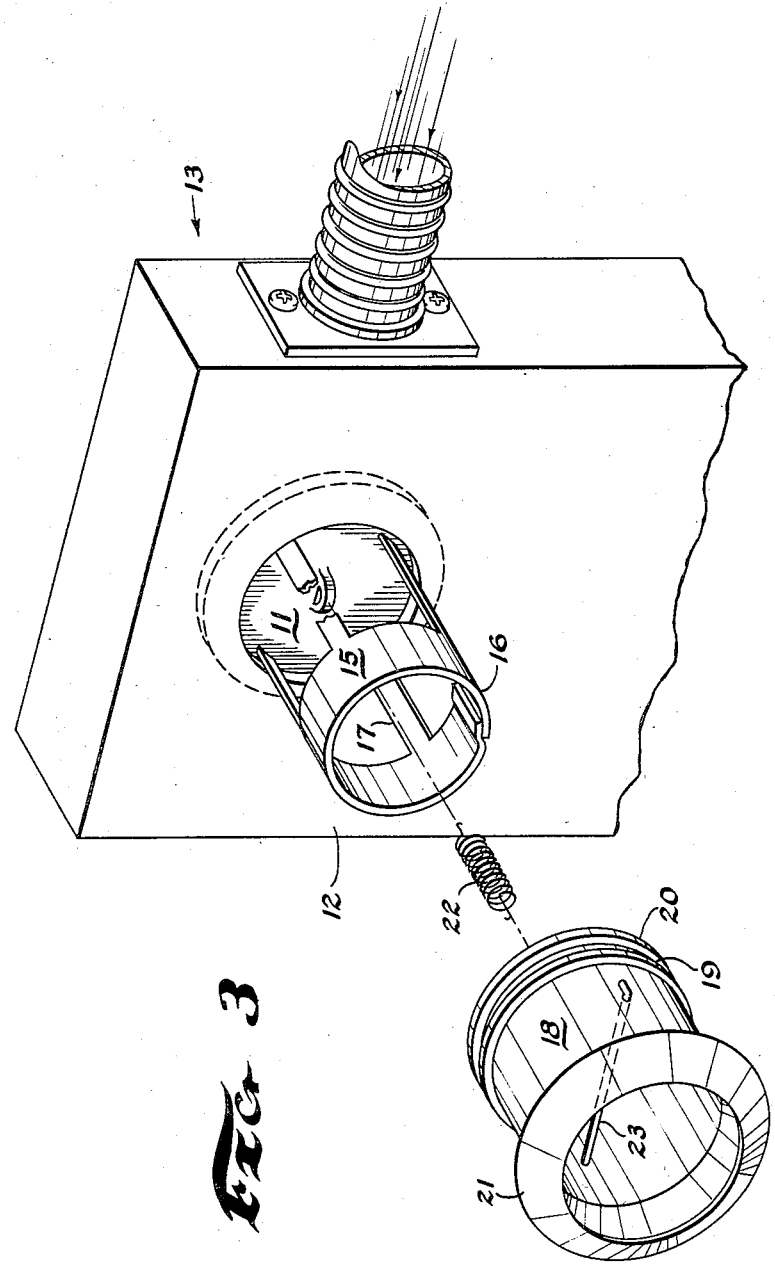
INVENTOR.
WALLACE R. GRISWOLD
HARRY M. PASSMAN
BY
ATTORNEY
AGENT

United States Patent Office 2,929,404
Patented Mar. 22, 1960

2,929,404

COUPLING-ACTUATED DUCT VALVE

Wallace R. Griswold and Harry M. Passman, Cedar Rapids, Iowa, assignors to Collins Radio Company, Cedar Rapids, Iowa, a corporation of Iowa Application May 19, 1958, Serial No. 736,085

2 Claims. (Cl. 137—560)

This invention pertains to fluid cooling systems and particularly to fluid valves that control flow of air to individual chassis in electronic equipments. In electronic equipments having a plurality of chassis, different ones of the chassis are cooled by individual streams of air from respective openings in a plenum duct. While a chassis is in its operating position in its respecitve rack, air flow from the respective opening is somewhat restricted by apertures that are located near component parts which require cooling. Removal of equipment for servicing may leave an unobstructed opening so that flow of air from the plenum duct is unnecessarily large. The valve of the present invention comprises a disk or stopple that is constantly being urged into a position for closing an outlet in a plenum duct, an actuating member or plunger that extends from the disk so that it is engaged by a mounted chassis to move the disk for opening the valve, and a resilient bellows enclosing the plunger for providing between the plenum and the chassis a secondary duct having an impervious wall.

An object of the invention is to provide a valve that closes automatically when a chassis is removed from its mounting rack. Another object is to provide between the valve opening and the chassis a secondary duct that is tightly sealed to the plenum duct and to the chassis.

The description and the appended claims can be more readily understood with reference to the accompanying drawings, in which:

Figure 3 is a prospective view of a partially exploded valve mounted in a plenum duct.

Figure 1:
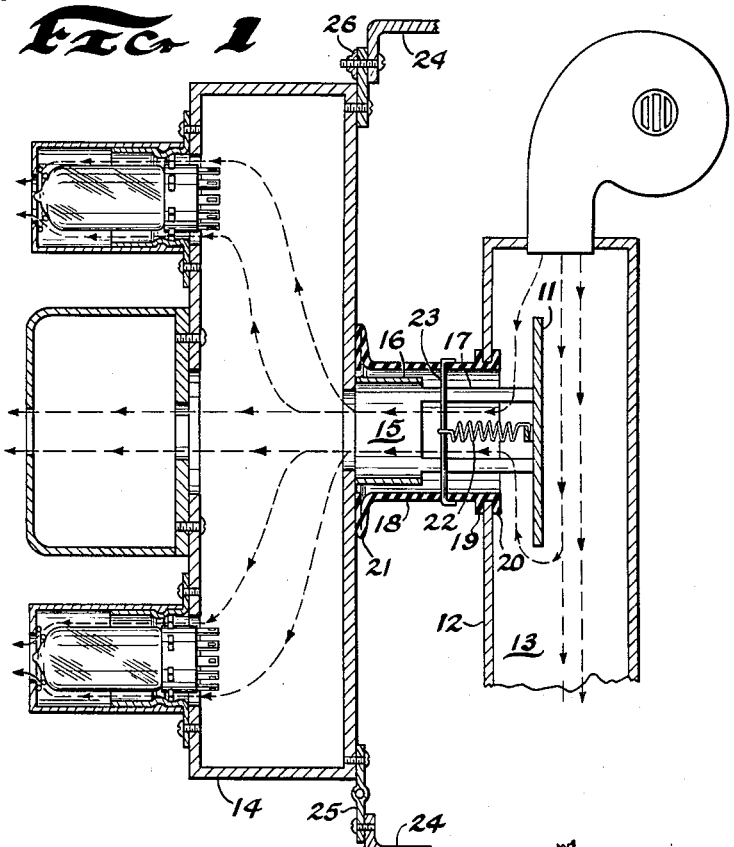
Figure 1 is a cross sectional view of the valve as it is held open by a mounted chassis.

With reference to Figure 1, a disk 11 of the valve controls the flow of air through the opening in wall 12 of plenum air duct 13. The placement of disk 11, which has a larger diameter than that of the opening, is changed with respect to the opening to control the flow of air to chassis 14 that is mounted adjacent to air duct 13. The position of valve disk 11 is controlled by plunger 15. The plunger comprises a cylindrical portion 16 which is mounted coaxially to and spaced apart from disk 11 by a plurality of narrow arcuate members 17. The plunger 15 as shown in Figure 3 may be described as being a cylinder that has relatively large equally spaced portions removed from one end of the wall in order to provide large openings. When the valve is open, these openings allow free flow of air from the plenum duct 13 around the disk and through the opening in wall 12 to chassis 14.

A substantially cylindrical sleeve or secondary duct 18 is attached to the inside edges of the circular opening in wall 12 in the same manner as a rubber grommet is attached to a hole in sheet material. The secondary duct may be fabricated from rubber or neoprene or other resilient material. The edge of the wall about the opening is enclosed by the groove 19 that is molded into one end of the secondary duct so that a gas-tight seal is formed between wall 12 and the duct. When the valve is closed, the plate 11 is urged tightly against lip 20 to form a gas-tight seal between the plenum duct and the secondary duct. The opposite end of the secondary duct has one or more circumferential convoluitons 21 so that it compresses evenly like a cylindrical bellows and forms a tight seal around an opening that is an air inlet in the rear panel of chassis 14. The actuating member 15 is constantly urged against chassis 14 by helical spring 22. One end of spring 22 is secured to the center of disk 11 and extends to the center of a retaining rod 23. In the embodiment shown, rod 23 is mounted in two diametrically opposite holes in the wall of the middle section of bellows 18. Short end portions of the rod are bent to retain the rod in place across the bellows. When the chassis 14 is removed for servicing or for replacement, the air valve is closed through tension of spring 22. The valve is useful not only in that it prevents the lowering of pressure in the plenum duct by an excess flow of air but also prevents flow of air on a service technician when the chassis is mounted as indicated in Figure 1.

Figure 2:
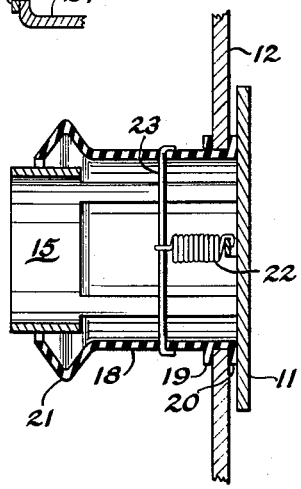
Figure 2 is a cross sectional view of the valve in a closed position.

For convenience the chassis 14 may be hinged to rack 24 so that it may be pivoted outwardly and downwardly for servicing. The chassis in Figure 1 which is shown secured at the lower edge by hinge 25 may be pivoted on this hinge by loosening fastener 26 at the upper edge of the chassis. The chassis may then be rotated through approximately 90° to facilitate servicing. A cross section of the closed valve is shown in Figure 2. The valve disk 11 is held tightly against resilient lip 20 of bellows 18 by the tension of spring 22.

The valve of the instant invention provides positive control of air flow in response to the removal or to the mounting of a chassis in a rack. Obviously the chassis cannot be replaced in the rack and become overheated on account of a closed valve, because the valve is automatically opened when the chassis is replaced. The cylindrical construction of the valve as shown in the accompanying drawings is probably the simplest and most practical construction of the valve. However, the valve can be modified to control air for various applications and still be within the spirit and scope of the following claims.

What is claimed is:

1. In electronic equipment, a fluid valve having a cylindrical convoluted sleeve of resilient material, a plenum duct having an opening for receiving said valve, said valve having a disk which has a diameter greater than the diameter of said opening, a cylindrical plunger having perforated walls, said plunger being mounted coaxially to said disk, one end of said sleeve being sealed to said plenum duct around said opening so that said sleeve communicates through said opening with said plenum duct, said disk being disposed within said plenum duct opposite said opening such that said plunger extends from said disk through said opening and through said sleeve, the other end of said sleeve being convoluted, means for constantly urging said disk outwardly against said plenum duct to prevent flow of fluid through said opening, said disk being displaced inwardly from same opening in response to inward pressure on said plunger, thereby opening said valve, and said plunger being approximately the same length as said sleeve so that inward motion of a transverse plane surface to said plunger for opening said valve will simultaneously compress said convoluted end of said sleeve and provide a fluid seal between said sleeve and said surface.

2. In electronic equipment having a pressure fluid cooling system, a valve and a secondary duct in combination, a plenum duct having a wall into which said combination is to be mounted, said valve comprising a disk and a plunger that is secured coaxially therewith, said plunger being cylindrical and having apertures in its wall adjacent said disk, said secondary duct being substantially cylindrical and having a resilient wall, one end of said secondary duct having external circumferential ridges that define a groove that have a width corresponding to the thickness of said wall of said plenum duct, the other end of said secondary duct being convoluted so that said secondary duct can be compressed longitudinally against a transverse plane surface of the chassis of said equipment to provide a fluid tight seal between said convoluted end of the wall of said secondary duct and said plane surface, the wall of said plenum duct having a circular opening which has a diameter substantially equal to the inside diameter of said groove, the grooved end of said secondary duct being mounted within said opening like a resilient grommet, said secondary duct extending outwardly from said plenum duct, said valve being slideably and concentrically mounted within said secondary duct, the disk of said valve being disposed within said plenum duct and said cylindrical plunger extending outwardly through said secondary duct, spring means for urging said disk tightly against said opening to close said valve, and said valve being opened in response to the outer end of said plunger being moved inwardly within the convoluted end of said secondary duct.

References Cited in the file of this patent

UNITED STATES PATENTS

| | | |
|---|---|---|
| 1,230,026 | Pullen | June 12, 1917 |
| 2,355,408 | Wyss | Aug. 8, 1944 |
| 2,547,106 | Zachariassen | Apr. 3, 1951 |
| 2,704,675 | Henderson | Mar. 22, 1955 |
| 2,771,904 | Sherman | Nov. 27, 1956 |

FOREIGN PATENTS

| | | |
|---|---|---|
| 825,025 | Germany | Dec. 17, 1951 |
| 1,132,410 | France | Nov. 5, 1956 |